July 12, 1949.   D. J. MUNROE   2,475,800
SPLIT PULLEY
Filed June 4, 1947
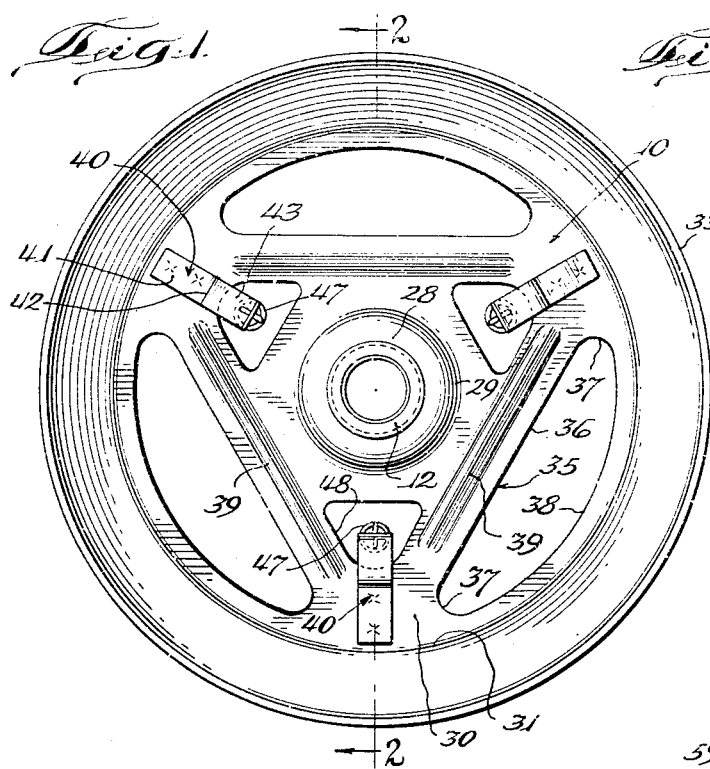
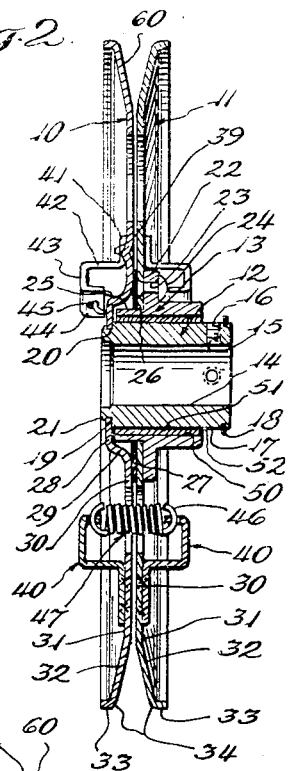
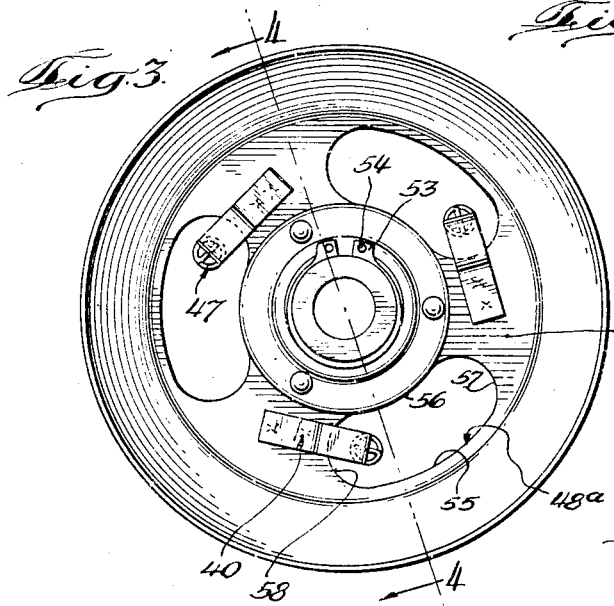
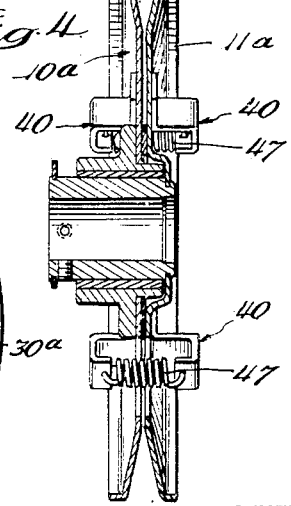
INVENTOR.
David J. Munroe
BY Robert H. Wendt
attorney Patented July 12, 1949

2,475,800

UNITED STATES PATENT OFFICE 2,475,800

SPLIT PULLEY

David J. Munroe, Racine, Wis., assignor to Webster Electric Company, Racine, Wis., a corporation of Delaware Application June 4, 1947, Serial No. 752,312

7 Claims. (Cl. 74—230.17)

The present invention relates to split pulleys, and is particularly concerned with split pulleys of the type adapted to engage what is usually called a V belt, but which is more aptly described as a belt of wedge shape in cross section.

One of the objects of the invention is the provision of an improved pulley of the V type, which comprises a pair of pulley sections slidably mounted with respect to each other and spring urged toward each other so that the split pulley is adapted to take up the slack in a V belt automatically, the effective diameter of the pulley varying according to the positions of the two pulley sections.

Another object of the invention is the provision of an improved pulley of the class described, which will not develop sympathetic vibrations which are due to irregular belt cross sections, and which is relatively noiseless in its operation.

Another object of the invention is the provision of an improved pulley of the split type in which there is no tendency of the one sliding section to cramp or bind on the other sliding section at the stationary hub thereof.

Another object of the invention is the provision of an improved split pulley construction in which it is unnecessary to provide any splines or keys for preventing relative rotation between the pulley sections, as the springs which urge the pulley sections together are also adapted to permit only a limited amount of relative rotation between the sections.

Another object of the invention is the provision of an improved split pulley contruction which may be manufactured with a minimum amount of machining, and many of the parts of which are adapted to be made out of sheet metal stampings so that the pulley may be manufactured at a low cost and sold within a price range which is available to a large number of the public.

Another object of the invention is the provision of an improved split pulley which is sturdy, durable, silent in operation, and which is adapted to be used for a long period of time without necessity for repair of replacement of any of its parts.

Other objects and advantages of the invention will be apparent from the following description and the accompanying drawings, in which similar characters of reference indicate similar parts throughout the several views.

Referring to the single sheet of drawings,

Fig. 1 is a side elevational view of a split pulley embodying my invention;

Fig. 2 is a vertical sectional view, taken on the plane of the line 2—2 of Fig. 1;

Fig. 3 is a view similar to Fig. 1 of a modification;

Fig. 4 is a modified sectional view, taken on the plane of the line 4—4 of Fig. 3, looking in the direction of the arrows.

The split pulleys embodying the invention preferably comprise a pair of pulley sections 10 and 11, one of which is fixedly mounted with respect to a hub 12, and the other of which has a sliding hub 13; and it is mounted movably with respect to the section 10 and hub 12. The hub 12 may consist of a cylindrical metal member provided with a cylindrical bore 14 for receiving the shaft on which the pulley is to be mounted.

The hub 12 may have a plurality of transverse threaded bores 15 for receiving set screws 16, which secure the hub on the shaft. At its right end the hub may have a groove in its external cylindrical surface 17 for receiving a split ring 18 of rectangular cross section, which serves as a stop member for preventing the movable section hub 13 from moving off the hub 12. At its left end the hub 12 is provided with a portion 19 of reduced cylindrical shape, which is located in a bore 20 in the pulley section 10 and riveted or spun over at 21 to secure the pulley section 10 on the hub 12.

The sliding hub 13 is provided with a cylindrical bore 50, which receives a bearing bushing 51 fixedly secured in said bore and adapted to have a sliding fit on the external cylindrical surface 52 of the fixed hub 12. The split ring 18 is shown in elevation in Fig. 3, and it preferably has enlarged end portions or heads 53 provided with apertures 54 for reception of a suitable tool used in spreading the split ring for its insertion or removal from the unit.

The sliding hub 13 is provided intermediate its ends with a radially extending flange 22, having a plurality of apertures 23 for receiving rivets 24 by means of which the pulley section 11 is secured to the sliding hub 13.

Hub 13 has its left cylindrical portion 25 of reduced size, and the pulley section 11 has an aperture 26 for receiving the reduced portion 25. A cushion of gasket material 27 is annular in form and adapted to be received on the reduced portion 25 and interposed between the pulley sections 10 and 11 to cushion their engagement and prevent clatter or noise when the two halves of the pulley come together.

This cushion 27 may be made of any suitable material, such as a cork compound called Corkilin, and is preferably cemented to the section 11. In order to provide a longer bearing surface for the sliding hubs 12 and 13 the pulley section 10 has an annular portion 28 and an annular inwardly extending offset 29, bringing the body 30 of this pulley section 10 over close to the pulley section 11, although the hubs extend to the left, beyond the location of the body portion 30.

Each pulley section has a body portion 30, and these body portions may be substantially similar in construction. They comprise circular disc-like portions bounded by the outward bend at an obtuse angle at 31, and each supporting at its outer edge the frusto-conical belt-engaging portions 32.

The belt-engaging portions 32 preferably have outwardly turned cylindrical flanges 33 at their peripheries, thus providing a smooth, rounded corner at 34 adjacent the belt so as to reduce wear on the belt over that which would be brought about if the edge were sharp.

The body portions 30 of each pulley section 10 and 11 may be provided with cut-outs 35; but these are not for the purpose of reducing the weight, but for the purpose of reducing the obstruction to the flow of air axially past and through the pulley into the rotor of a centrifugal blower, with which these pulleys are often used.

In the construction illustrated the cut-outs 35 have one straight side 36, rounded, partially circular ends 37, and circular outer boundaries 38, the latter being concentric with the periphery of the pulley.

In order to increase the strength of the pulley the body portions 30 of each pulley section are provided with reinforcing ribs 39 parallel to the straight side 36 of the cut-outs 35, and the ribs are pressed outwardly, that is, away from the opposite pulley section, so that they will not interfere with the pulley sections coming close together.

The reinforcing ribs 39 define a triangular central area around the hub 12, at each of the corners of which each pulley section is provided with a spring supporting bracket 40. The spring supporting brackets each have an attaching flange 41 which may be welded to the body 30 of the pulley section.

Each bracket is made of a strip of sheet metal, such as steel, and has an axially extending portion 42 (Fig. 2) and a radially and inwardly extending spring supporting flange 43. The spring supporting flange 43 has an inwardly turned end portion 44 that is provided with an aperture 45 for receiving the hooked end 46 of a helical tension spring 47.

The body 30 of each pulley section 10 or 11 is provided with triangular apertures 48 surrounding the springs 47; and the springs 47 extend from a bracket 40 on one pulley section to the opposite bracket 40 on the other pulley section.

Referring to Fig. 2, it will be seen that the springs 47 are initially tensioned, even when the pulley sections are drawn together into engagement with the pad 27. Thus the springs 47 tend to draw the pulley sections together and to increase the effective diameter of the pulley. The springs also tend to prevent relative rotation between the two pulley sections in addition to drawing the two sections toward each other.

Referring to Figs. 3 and 4, this is a modified structure which may be used for smaller sized pulleys. In this case the structure adjacent the two hubs may be exactly the same, but the body portion 30a is relatively smaller in size and provided with a plurality of cut-outs 48a of a different shape.

In this case each cut-out is bounded by an external cylindrical edge 55 and an internal circular edge 56; and the cut-out is elongated peripherally and provided with rounded end portions. The spring supporting brackets 40 in this case may be identical in construction with those previously described, but the straps of which they are made extend substantially tangentially to a circle located at their point of attachment.

The springs 47 have a much longer range of movement when one pulley section moves relatively to the other, such as the pulley section 10a and the pulley section 11a. In any event, the brackets and springs are preferably symmetrically located with respect to the center of the pulley so that the pulley will be balanced.

The operation of the split pulley is as follows: The two pulley sections are drawn toward each other by the springs 47, which also connect the pulley sections and tend to resist relative rotation between them.

The frusto-conical belt-engaging flanges 32 have the opposed frusto-conical surfaces 59 and 60, which are engaged by a V belt. When the pulley sections are close together, the V belt rides on the outermost portions of the surfaces 59 and 60.

The present pulley is preferably employed with other automatically adjustable V pulleys so that the present pulley is used to take up the slack in the belt. If there is any slack in the belt, the springs 47 tend to draw the pulley sections together and to increase the effective diameter of the pulley by causing the belt to ride at a greater radius from the axis of the pulley.

If the slack in the belt is taken up by some other factor or pulley engaging the belt which is used, then the V belt is pulled farther into the groove between the surfaces 59 and 60, forcing the pulley sections apart against the tension of the springs 47 and constantly maintaining the belt in a suitably taut condition.

The pulley section 10, having its hub 12 fixedly secured to the shaft of a driven device, the belt may slip on the surface 60 of the pulley section 10 and may carry with it the pulley section 11, causing the pulley sections to rotate slightly with respect to each other.

This, however, is resisted by the springs. The possibility of peripheral movement between the hubs 12 and 13 aids in maintaining a free sliding condition between the pulley sections at all times; and this is also facilitated by the absence of grooves and splines between the hubs.

It will thus be observed that I have invented an improved split pulley which is simple in construction, and which may be manufactured at a low cost, and which also operates without any tendency of the sliding member to bind or cramp on the stationary hub.

The sliding movement between the sections is aided by the fact that the belt wraps around more than fifty percent of the circumference of the pulley, since this is the larger of the two pulleys engaging the same belt.

The present device operates quietly and does not develop any sympathetic vibrations which are usually due to irregular belt cross sections in the devices of the prior art. When the present pulley is used with a section pulley of the type in which the relative movement of the sections is controlled by a thermostat, the latter is generally the smaller of the two pulleys and, as the effective diameter of the present driven pulley decreases as the thermostatic pulley diameter increases, a larger range or speed variation is obtained for the driven member.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a variable diameter pulley, the combination of a hub adapted to be secured upon a shaft, said hub supporting a sheet metal pulley disc adjacent one of its ends, with a second hub, the second hub having a bore for receiving the first hub and being slidably and rotatably mounted thereon, and a second pulley disc mounted on said second hub, said discs being provided adjacent their peripheries with inner frusto-conical opposed surfaces for engaging a V pulley, and resilient means for urging said discs together and simultaneously preventing more than a limited amount of rotation between the discs, the said resilient means comprising tension spring means secured to one disc, passing through both discs, and secured to the other disc, each of said discs being provided with bracket means for supporting the spring means, and the bracket means having an outward offset to provide for a substantial length of spring means, even when the discs are close together.

2. In a sectional pulley, the combination of a pair of sheet metal discs, each of said discs being formed adjacent its periphery with an inner frusto-conical surface, and said frusto-conical surfaces opposing each other to form a V groove for a V pulley, one of said discs being provided with a central aperture for receiving a reduced part of a hub adapted to be secured to a shaft, the said reduced part being deformed to confine said disc on the hub, the other of said discs having means for attaching it to a second hub, the latter hub being slidably mounted on the first hub and being mounted for rotation, and resilient means for urging said discs together and for simultaneously resisting resiliently the tendency of the discs to rotate with respect to each other, said resilient means comprising a plurality of tension springs located symmetrically with respect to the axis of the pulley and passing through both discs, one end being secured to one disc, and the other end to the other disc, each disc having a plurality of supporting brackets for said springs, and the brackets having an outwardly offset portion for supporting the spring, whereby the spring may be made of greater length, although the discs may be adjacent to each other.

3. In a split pulley, the combination of a pair of stamped sheet metal half-pulley members substantially similar in construction, each half-pulley member being formed with a substantially flat central portion having an aperture for receiving a hub, an integral outwardly turned frusto-conical portion for engaging one side of a V-belt and an integral outwardly turned cylindrical edge portion, a pair of hub members comprising inner and outer hubs, the innermost of said hubs having a substantially cylindrical bearing bore for receiving a shaft and means for securing it on said shaft, said inner hub being secured to one of said stampings in the central bore thereof, the outer of said hubs having a bearing bore slidably and rotatably engaged upon the outer cylindrical surface of the inner hub and the inner hub being of greater length than the outer hub, said outer hub being fixedly secured to the other of said stampings in the central bore thereof, the plane portion of said stampings being provided with a plurality of apertures, the apertures being symmetrically located and similar in shape, a bracket carried by each stamping on its outer surface adjacent said aperture, said bracket including an outwardly extending portion and a radially extending portion, the adjacent brackets of the two different stampings being connected by means of tensioned coil springs extending through said apertures tending to draw said stampings together and resisting but permitting a limited amount of relative rotation between the stampings.

4. In a split pulley, the combination of a pair of stamped sheet metal half-pulley members substantially similar in construction, each half-pulley member being formed with a substantially flat central portion having an aperture for receiving a hub, an integral outwardly turned frusto-conical portion for engaging one side of a V-belt and an integral outwardly turned cylindrical edge portion, a pair of hub members comprising inner and outer hubs, the innermost of said hubs having a substantially cylindrical bearing bore for receiving a shaft and means for securing it on said shaft, said inner hub being secured to one of said stampings in the central bore thereof, the outer of said hubs having a bearing bore slidably and rotatably engaged upon the outer cylindrical surface of the inner hub and the inner hub being of greater length than the outer hub, said outer hub being fixedly secured to the other of said stampings in the central bore thereof, the plane portion of said stampings being provided with a plurality of apertures, the apertures being symmetrically located and similar in shape, a bracket carried by each stamping on its outer surface adjacent said aperture, said bracket including an outwardly extending portion and a radially extending portion, the adjacent brackets of the two different stampings being connected by means of tensioned coil springs extending through said apertures tending to draw said stampings together and resisting but permitting a limited amount of relative rotation between the stampings, the outer of said hubs being confined on the inner of said hubs at one end by the stamping carried by the inner hub, and a thrust member carried by the other end of the inner hub for limiting the axial motion of the outer hub on the inner hub.

5. In a split pulley, a pair of similar sheet metal members, each of said sheet metal members being formed with a central circular aperture for receiving a hub, and each of said sheet metal members being provided with a substantially triangular plane portion surrounding said hub, said plane portion being bordered along the sides of said triangular portion by re-enforcing ribs, and said sheet metal members having a further plane portion outside of said triangular portion, and said latter plane portion being provided with apertures elongated located along the sides of the triangular portion and bounded by a partially circular line on one side and a straight line on the opposite side, the said sheet metal members being provided with integral outwardly turned frusto-conical flanges beyond said latter apertures for engaging with the sides of a V-belt, and a pair of hubs, the said hubs being slidably mounted one upon the other and the one being shorter and the other longer, each of said hubs carrying one of said sheet metal members, and the smaller and longer of said hubs being provided with a thrust member on the end opposite to the said metal member to limit relative sliding movement between the hubs, and resilient tensioned coil springs secured at both ends by brackets carried by said members and extending through additional apertures in said triangular plane portions at equally spaced points in said sheet metal members for drawing said sheet metal members together, and resisting but permitting limited relative rotation between them.

6. In a split pulley, a pair of similar sheet metal members, each of said sheet metal members being formed with a central circular aperture for receiving a hub, and each of said sheet metal members being provided with a substantially triangular plane portion surrounding said hub, said plane portion being bordered along the sides of said triangular portion by re-enforcing ribs, and said sheet metal members having a further plane portion outside of said triangular portion, and said latter plane portion being provided with apertures elongated located along the sides of the triangular portion and bounded by a partially circular line on one side and a straight line on the opposite side, the said sheet metal members being provided with integral outwardly turned frusto-conical flanges beyond said latter apertures for engaging with the sides of a V-belt, and a pair of hubs, the said hubs being slidably mounted one upon the other and the one being shorter and the other longer, each of said hubs carrying one of said sheet metal members, and the smaller and longer of said hubs being provided with a thrust member on the end opposite to the said metal member to limit relative sliding movement between the hubs, and resilient tensioned coil springs secured at both ends to brackets carried by said members and extending through additional apertures in said triangular plane portions at equally spaced points in said sheet metal members for drawing said sheet metal members together, and resisting but permitting limited relative rotation between them, the said metal member which engages the inner, smaller and longer hub having an offset portion adjacent its point of securement to said hub to bring the plane portion of said sheet metal member into a position inwardly of the end of said latter hub.

7. In a split pulley, a pair of similar sheet metal members, each of said sheet metal members being formed with a central circular aperture for receiving a hub, and each of said sheet metal members being provided with a substantially triangular plane portion surrounding said hub, said plane portion being bordered along the sides of said triangular portion by re-enforcing ribs, and said sheet metal members having a further plane portion outside of said triangular portion, and said latter plane portion being provided with apertures elongated located along the sides of the triangular portion and bounded by a partially circular line on one side and a straight line on the opposite side, the said sheet metal members being provided with integral outwardly turned frusto-conical flanges beyond said latter apertures for engaging with the sides of a V-belt, and a pair of hubs, the said hubs being slidably mounted one upon the other and the one being shorter and the other longer, each of said hubs carrying one of said sheet metal members, and the smaller and longer of said hubs being provided with a thrust member on the end opposite to the said metal member to limit relative sliding movement between the hubs, and resilient tensioned coil springs secured at both ends to brackets carried by said members and extending through additional apertures in said triangular plane portions at equally spaced points in said sheet metal members for drawing said sheet metal members together, and resisting but permitting limited relative rotation between them, the said metal member which engages the inner, smaller and longer hub having an offset portion adjacent its point of securement to said hub to bring the plane portion of said sheet metal member into a position inwardly of the end of said latter hub, and the outer and shorter but larger of said hubs having a radially extending flange located between its ends and secured to one of said sheet metal members, the said metal members coming close together with their plane surfaces substantially engaging each other except when they are forced apart by a V-belt engaging the frusto-conical flanges of said sheet metal members.

DAVID J. MUNROE.

REFERENCES CITED

The following references are of record in the file of this patent:

UNITED STATES PATENTS

| Number | Name | Date |
|---|---|---|
| 1,284,683 | Holy | Nov. 12, 1918 |
| 1,900,222 | Bowen | Mar. 7, 1933 |
| 2,260,795 | Burns | Oct. 28, 1941 |
| 2,337,308 | Buote | Dec. 21, 1943 |
| 2,369,681 | Miles | Feb. 20, 1945 |

FOREIGN PATENTS

| Number | Country | Date |
|---|---|---|
| 18,035 | Great Britain | Aug. 8, 1907 |